(12) United States Patent
Hartshorne et al.

(10) Patent No.: US 6,748,975 B2
(45) Date of Patent: Jun. 15, 2004

(54) MICROFLUIDIC VALVE AND METHOD OF MANUFACTURING SAME

(75) Inventors: Herbert A. Hartshorne, Edmonton (CA); Graham H. McKinon, Edmonton (CA); Pengguang Yu, Edmonton (CA); Darren F. Lewis, Calgary (CA)

(73) Assignees: Micralyne Inc., Edmonton (CA); MDS Inc., Concord (CA); MDS Proteomics Inc., Toronto (CA)

( * ) Notice: Subject to any disclaimer, the term of this patent is extended or adjusted under 35 U.S.C. 154(b) by 194 days.

(21) Appl. No.: 10/025,989

(22) Filed: Dec. 26, 2001

(65) Prior Publication Data

US 2003/0116206 A1 Jun. 26, 2003

(51) Int. Cl.[7] ............................ F16K 11/10; F16K 3/10
(52) U.S. Cl. .................................. 137/625.46
(58) Field of Search ...................... 137/625.46; 422/103

(56) References Cited

U.S. PATENT DOCUMENTS

| 4,242,909 A | 1/1981 | Gundelfinger |
| 4,625,569 A | 12/1986 | Toei et al. |
| 5,400,824 A | * 3/1995 | Gschwendtner et al. ............ 137/625.28 |
| 5,865,417 A | 2/1999 | Harris et al. |
| 6,012,488 A | 1/2000 | Nichols |
| 6,155,123 A | 12/2000 | Bakalyar |
| 6,267,143 B1 | 7/2001 | Schick |
| 6,585,296 B1 | * 7/2003 | Picha et al. ............ 285/124.1 |

FOREIGN PATENT DOCUMENTS

EP 1 197 693 A2 9/2001

OTHER PUBLICATIONS

Monolithic Microfabricated Valves and Pumps by Multi-layer Soft Lithography, Marc A. Unger, Hou–Pu Chou, Todd Thorsen, Axel Scherer, and Stephen R. Quake, Department of Applied Physics, California Institute of Technolgoy, Science, vol. 288, Apr. 7, 2000.

* cited by examiner

*Primary Examiner*—John Fox
(74) *Attorney, Agent, or Firm*—Bereskin & Parr

(57) ABSTRACT

A microfluidic rotary valve and methods of manufacturing same are disclosed. The rotary valve includes a stator chip having at least one inlet and at least one outlet. The rotary valve also includes a rotor having at least one rotor channel in sealed engagement with the stator chip. The rotor rotates between valve positions preventing and allowing fluid communication between the inlets and outlets by way of the rotor channels and according to the design of the inlets, outlets and rotor channels. The stator chip includes a first planar substrate having a contact face and a second planar substrate having a contact face bonded to the contact face of the first planar substrate. The first planar substrate defines a first portion of the inlet and outlet, and the second planar substrate defines a second portion of the inlet and outlet.

35 Claims, 12 Drawing Sheets

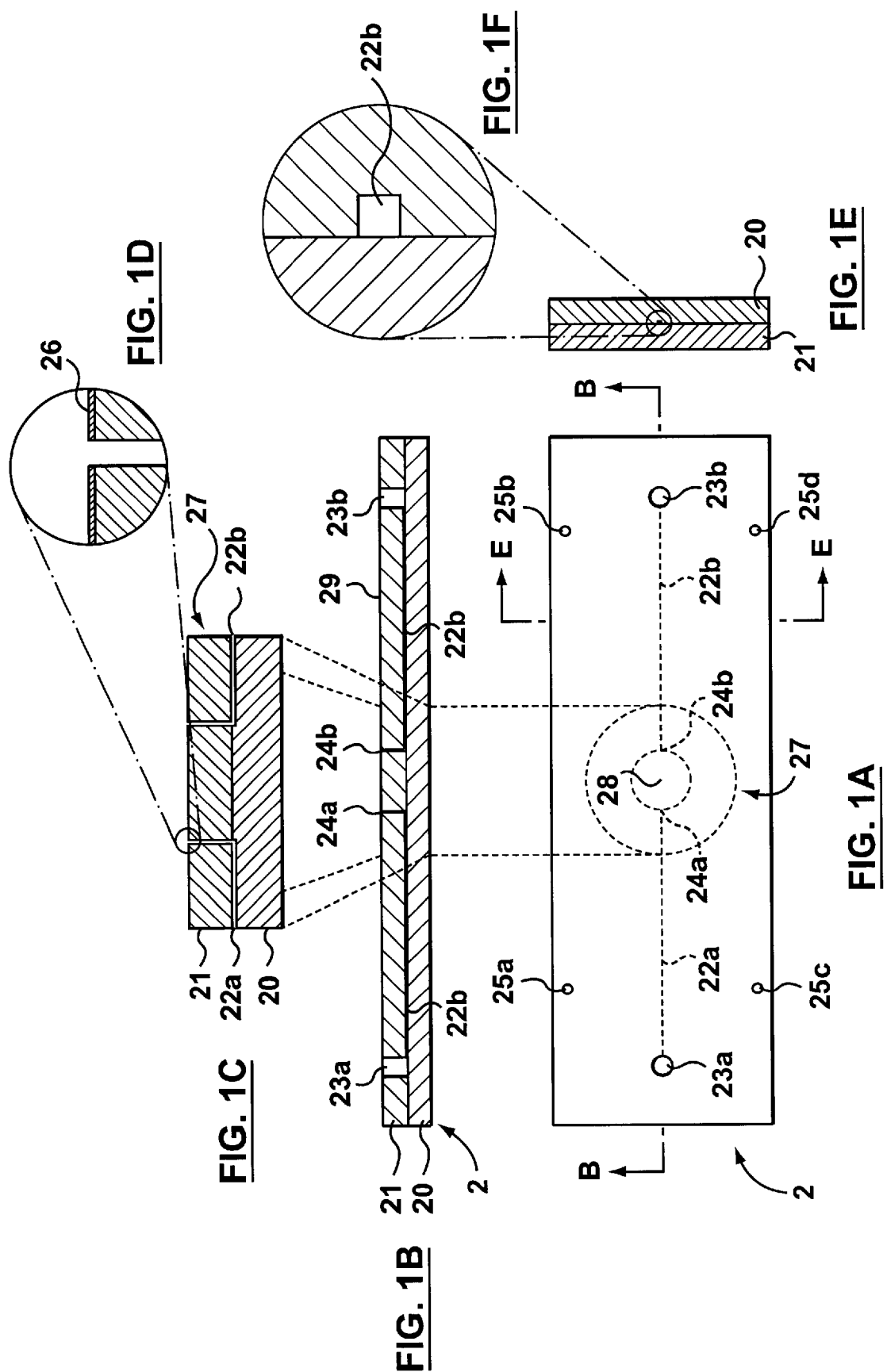

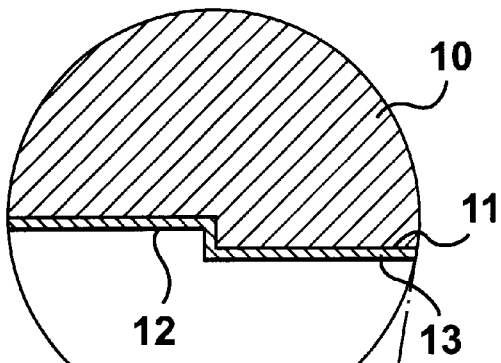
FIG. 2C
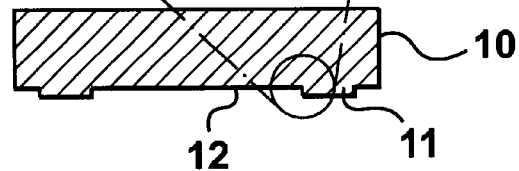
FIG. 2B
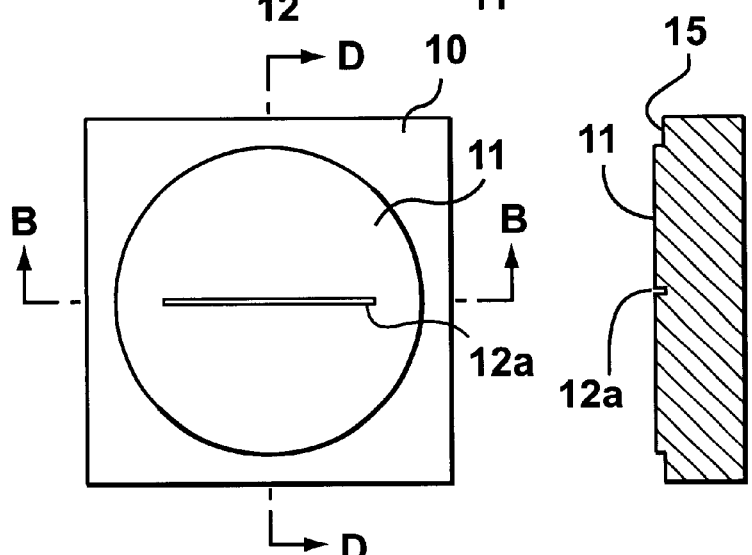
FIG. 2A
FIG. 2D

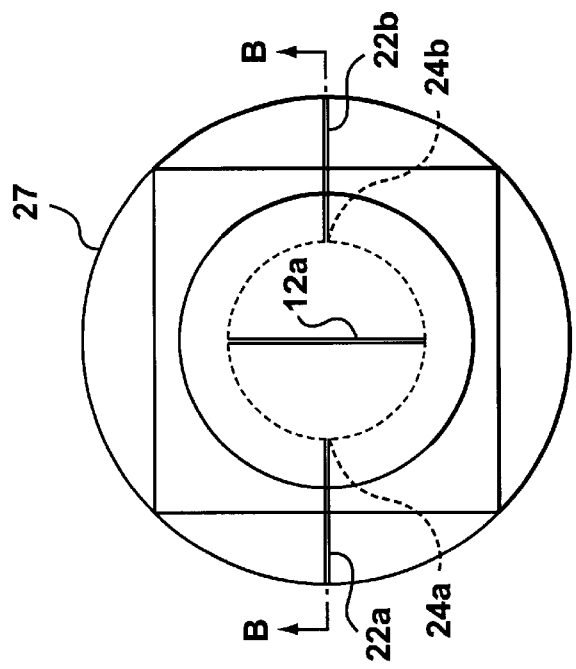
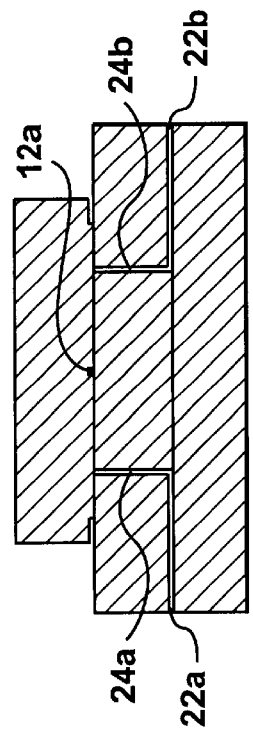
FIG. 3A
FIG. 3B
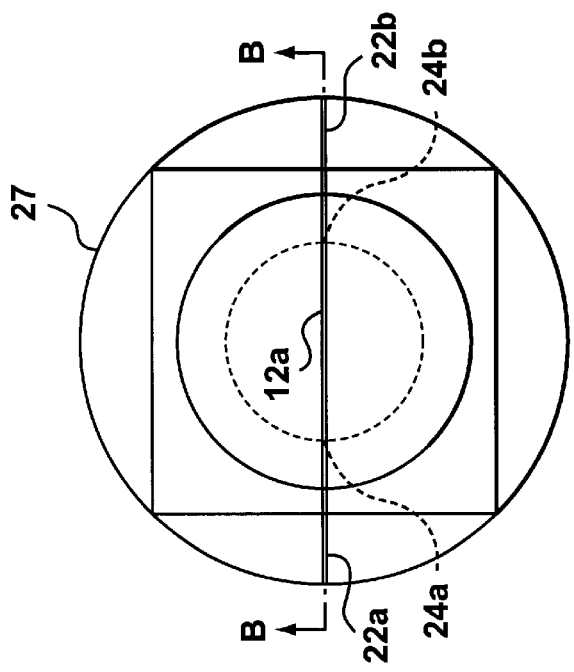
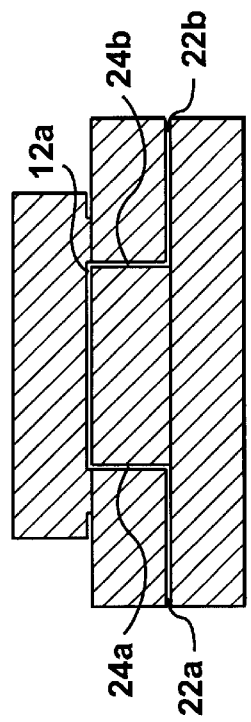
FIG. 4A
FIG. 4B

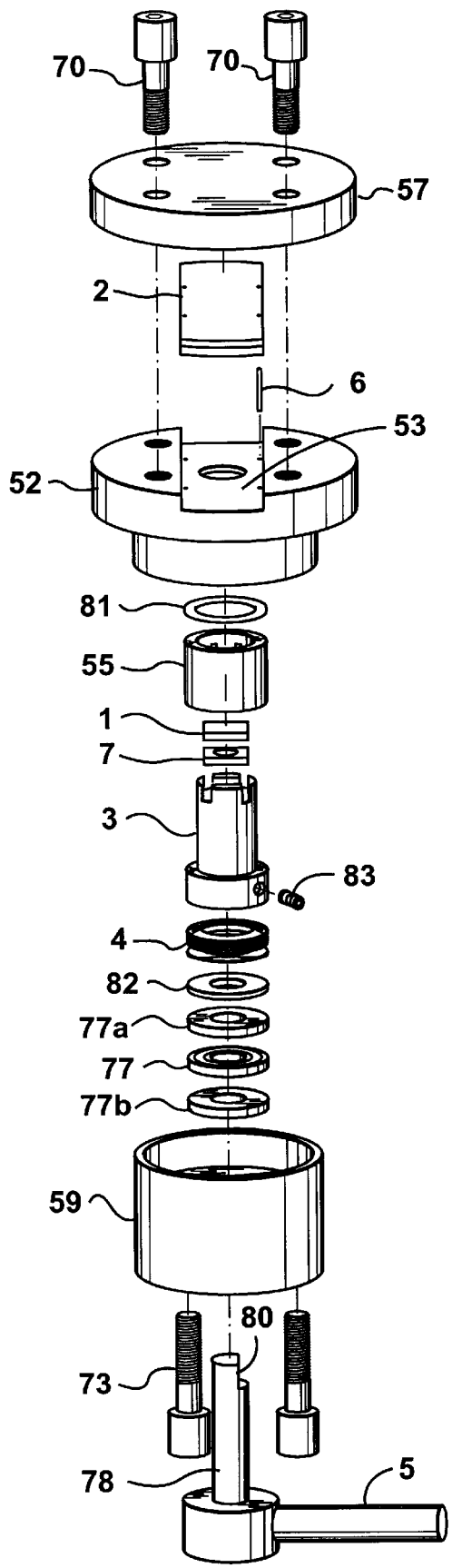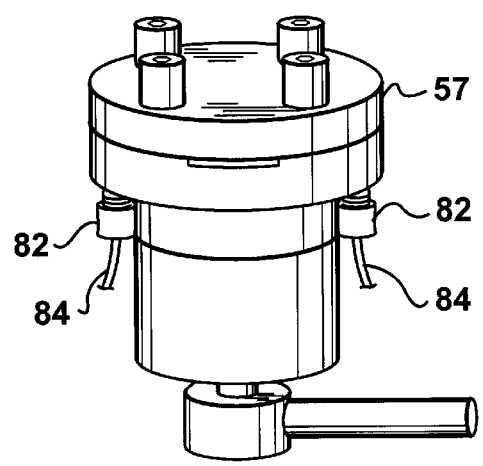
FIG. 7
FIG. 8

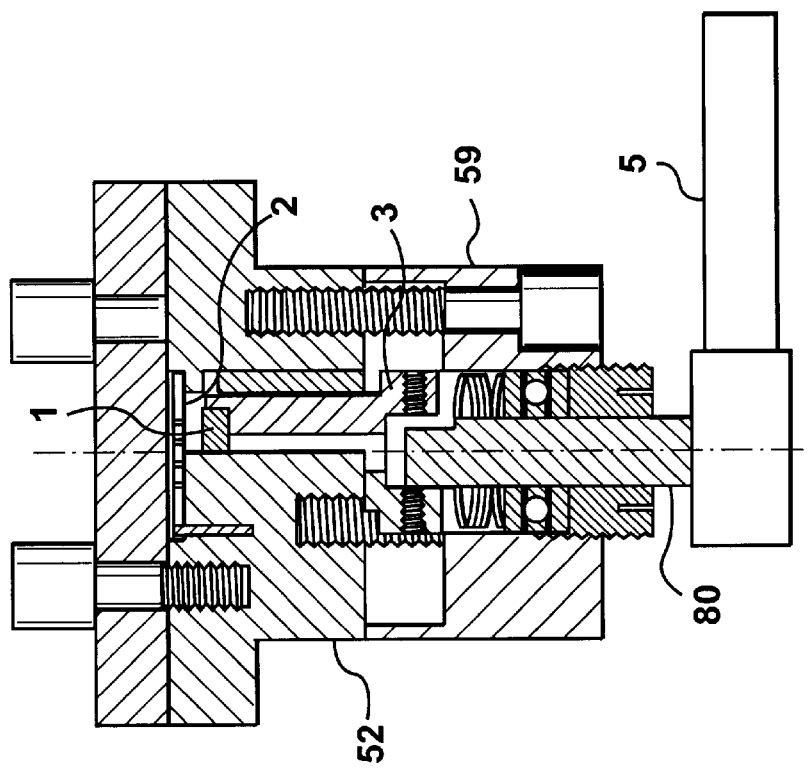
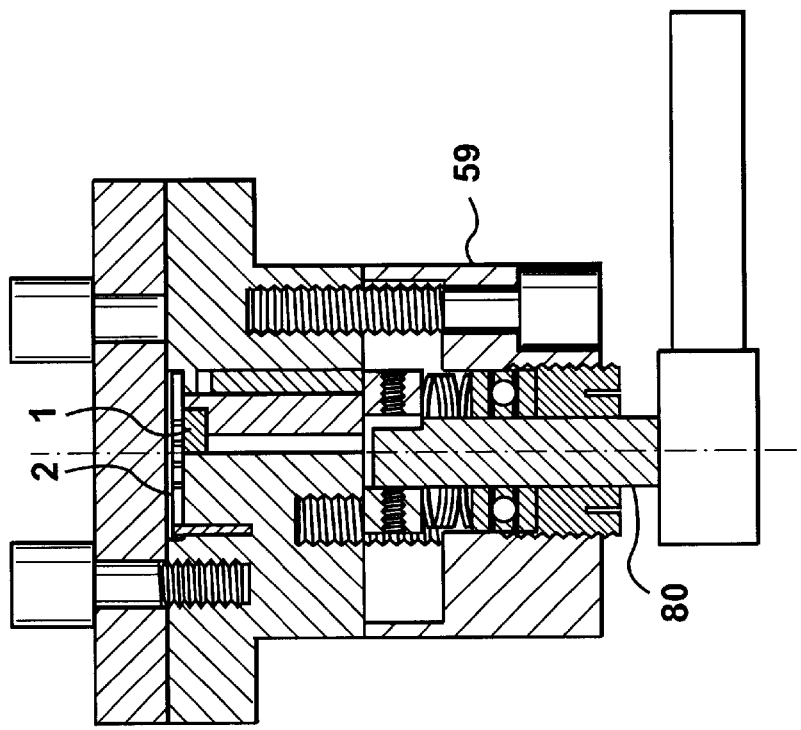

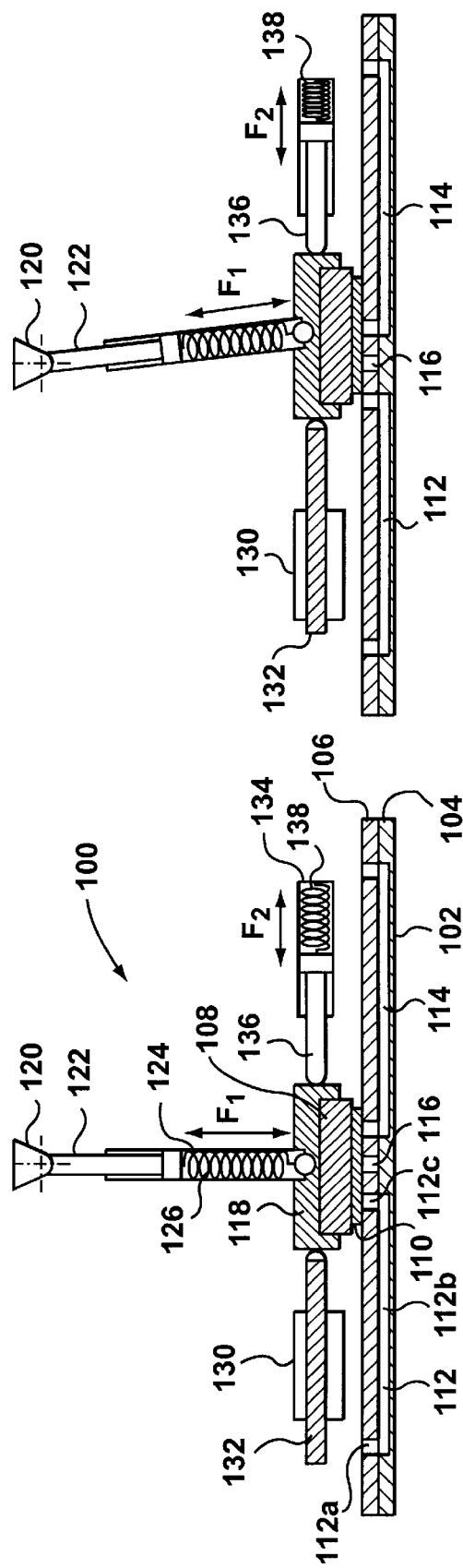

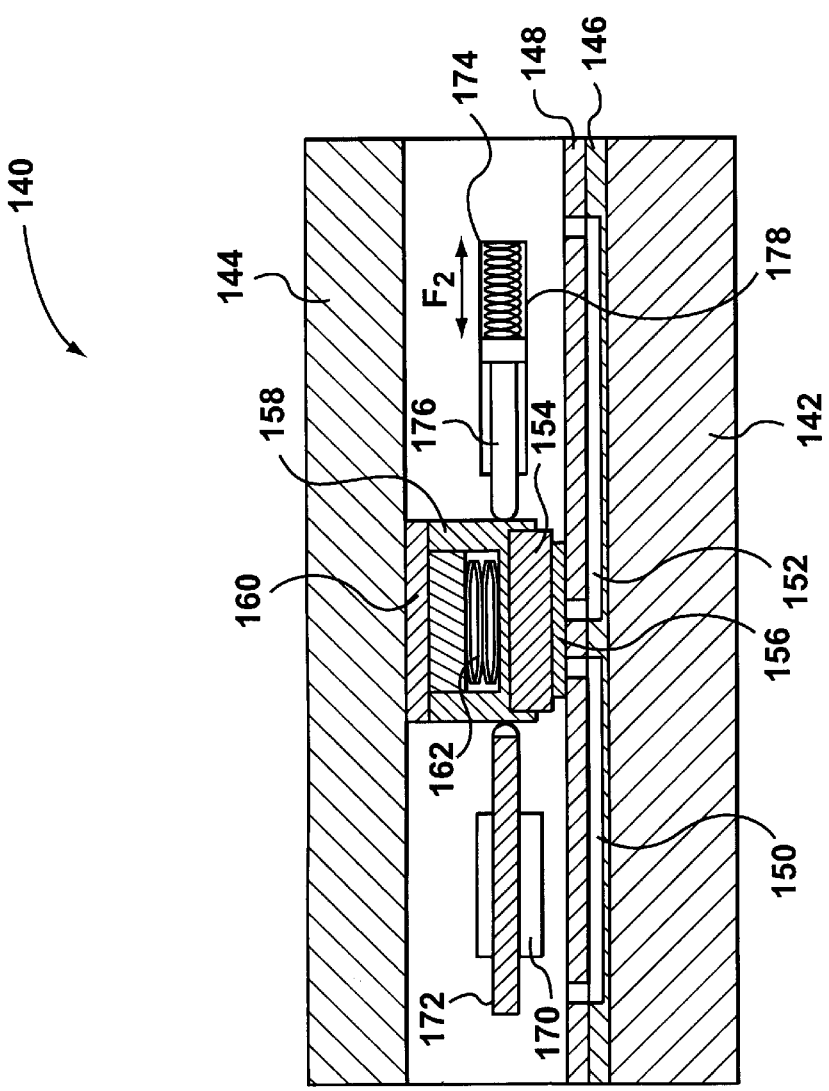

MICROFLUIDIC VALVE AND METHOD OF MANUFACTURING SAME

FIELD OF THE INVENTION

The invention relates to microfluidic devices, and in particular, to a rotary microfluidic valve.

BACKGROUND OF THE INVENTION

The last few years have seen a great increase in the use of microfluidic chips for analytical chemistry. Microfluidic chips are generally constructed using planer micromachining techniques. In particular, the chips are built by stacking layers of materials and by etching portions of these layers away or by building upon them with further layers. The most basic microfluidic chip is a closed channel built by etching a trench into a first substrate and by bonding another substrate over these trenches. Access holes (vias) may be drilled in either the first or second substrates prior to bonding to provide a connection between the outside world and the internal channels.

The are many advantages of chip-based systems for analytical chemistry. First, a high degree of integration is attainable as entire networks of channels can be built into a chip. For example, chromatographic sample preparation, metering, injection and separation, previously carried using discrete components connected together with tubing, can occur in a single device. Second, this integration dramatically reduces the total volume of the system, reducing reagent costs and reducing resolution losses due to the high volume of connections. Third, as diffusion time is proportional to the square of the diffusion distance, the small channel dimensions attainable using microfluidics allow vast reductions in thermal and molecular diffusion times and thereby allow faster reactions. In general, microfluidic devices allow a reduction in the cost of materials and in reaction time while improving detection efficiency.

However, macromachined rotary valves are still widely used, especially in the fields of liquid chromatography (LC) and High Performance Liquid Chromatography (HPLC), where such valves are standard for controlling injection volumes, dilution rates and for defining a flow path. The advantages of transferring chemical analysis to a microfludic chip platform is hindered by a loss of functionality provided by conventional components, such as the macromachined rotary valves.

U.S. Pat. No. 4,625,569 discloses a macromachined rotary valve having a number of rotor and stator combinations. As detection techniques improve, the LC and HPLC systems are moving towards smaller and smaller volumes. Accordingly, discrete tubing connecting to the valve and the size of conventionally machined conduits, as disclosed in U.S. Pat. No. 4,625,569, are disadvantageous, as they become a significant contributor to the overall volume.

U.S. Pat. No. 6,267,143 discloses a ferrule cluster to reduce the valve volume, producing a 54 nL port-to-port valve. The assignee of this patent (Upchurch Scientific) has applied for a U.S. patent for a 25 nL rotary valve that in addition to the ferrule cluster uses a micromachined rotor. As such, this valve is a hybrid between conventional machining techniques and discrete fluid transfer conduits and micromachined techniques and integrated conduits. The valve disclosed in U.S. Pat. No. 6,127,143 is disadvantageous, as it discloses a conventional macromachined stator, requiring discrete tubing and contributing significantly to the overall volume of the system.

There are several microfluidic valves known in the prior art. One of these is the family of diaphragm valves. Such valves use a thin layer of an elastic material, the diaphragm, as one of the layers in the microfluidic chip. Channels connect to either side of a valve cavity, which is interrupted by the diaphragm. In the closed state the diaphragm pushes against a valve seat preventing fluid from flowing past the seat. In the open state the diaphragm is released from the valve seat allowing fluid to flow between the channels. Such a valve has several disadvantages. The first is that as additional diverse materials and layers are used processing becomes more complicated, more prone to failure and thus more expensive. A second is that few materials are suitable for use as a membrane. The most popular membrane material is silicone rubber which is quite permeable to a wide range of commonly used liquids and gasses. A thin silicon substrate is another widely used choice that has better chemical, physical and process compatibility than silicone but which is rather rigid in comparison.

The majority of the prior art diaphragm valves have limited functionality. They are 1:1 or 1:2 valves. Valving schemes (such as many used widely in liquid chromatography) that require 1:n valves require n individual 1:1 valves or n−1 individual 1:2 valves. As the number of such valves on a single chip increases, the cost of the composite valve also rises as the process yield necessarily goes down. In addition, each constituent valve has its own dead volume and swept volume. The total dead and swept volume of the 1:n valve becomes large very quickly.

The known microfluidic valves are also limited in terms of sustainable pressure. Sustainable pressures of 5–8 psi are typical, though sustainable pressures of up to 140 psi have been reported.

Further, diaphragm valves raise the complexity and the price of a microfluidic chip. A large potential market for microfluidics is in settings (e.g. medical diagnostics, drug discovery) where cleanliness and ease-of-use necessitates the one-time use of microfluidic chips. Therefore, a valve which features the low volumes associated with microfluidics but which simplifies manufacturing is desirable.

Accordingly, a need exists for a microfluidic valve that is easily manufactured, highly flexible in functionality, and that can operate at higher pressures than prior art valves. It is also seen that there is a need for rotary valve that has advantages over the current state-of-the-art in macromachined rotor valves in nanoliter swept volumes and in the integration with microfluidic pathways instead of discrete capillary or tubing.

SUMMARY OF THE INVENTION

According to a first aspect of the present invention, a microfluidic valve is provided. The valve comprises:

a) a stator chip defining at least one inlet and at least one outlet therein; and b) a rotor sealably engaging the stator chip, the rotor defining at least one rotor channel therein, said rotor being rotatable between a closed position preventing fluid communication between at least one inlet and at least one outlet, and an open position where at least one rotor channel is in fluid communication with at least one inlet and at least one outlet.

Preferably, the rotor has a facing surface and the stator chip defines a stator cluster portion for sealably engaging the facing surface of the rotor, wherein the at least one inlet and the at least one outlet open onto the stator cluster portion, and, the stator chip includes at least one microfluidic device in fluid communication with the stator cluster portion.

According to a second aspect of the invention, a microfluidic valve is provided. The valve comprises:

a) a stator chip defining an inlet and an outlet therein; and b) a second chip sealably engaging the stator chip, the second chip defining a valve channel therein, the second chip being movable between a closed position preventing fluid communication between the inlet and the outlet, and an open position where the valve channel is in fluid communication with the inlet and the outlet.

Preferably, the second chip defines a facing surface and the stator chip defines a stator cluster portion for sealably engaging the facing surface of the second chip, wherein the inlet and outlet open onto the stator cluster portion, and the stator chip includes at least one microfluidic device in fluid communication with the stator cluster portion.

According to a third aspect of the present invention, a stator chip for a microfluidic rotary valve having a rotor is provided. The stator chip comprises:

a) a first planar substrate having a contact face; and b) a second planar substrate having a contact face sealably secured to the contact face of the first planar substrate;

wherein the first planar substrate defines a first portion of each of at least one inlet and at least one outlet, and the second planar substrate defines a second portion of each of the at least one inlet and the at least one outlet, the at least one inlet and the at least one outlet being adapted to be brought into fluid communication by the rotor.

Preferably, the stator chip defines a stator cluster portion for sealably engaging a facing surface the rotor, wherein the at least one inlet and the at least one outlet open onto the stator cluster portion, and wherein the stator includes at least one microfluidic device.

According to a fourth aspect of the present invention, a method of manufacturing a stator chip for a microfluidic rotary valve is provided. The method comprises the steps of:

a) forming at least one first inlet channel and at least one first outlet channel in a first planar stator substrate;

b) forming at least one second inlet channel and at least one second outlet channel in a second planar stator substrate;

c) sealably securing the first stator substrate to the second stator substrate, such that the at least one first inlet channel is in fluid communication with the at least one second inlet channel and the at least one first outlet channel is in fluid communication with the at least one second outlet channel.

According to a fifth aspect of the present invention, a method of manufacturing a planar rotor chip for a microfluidic rotary valve is provided. The method comprises the steps of:

a) forming a rotor contact surface on the rotor chip;

b) forming a rotor channel in the rotor contact surface, the rotor channel being adapted to bring at least one stator inlet channel in fluid communication with at least one stator outlet channel; and c) forming a low friction material layer on the contact rotor surface.

BRIEF DESCRIPTION OF THE DRAWINGS

For a better understanding of the present invention and to show more clearly how it may be carried into effect, reference will now be made, by way of example only, to the accompanying drawings which show preferred embodiments of the present invention and in which:

FIG. 1A is a plan view of a stator chip according to a preferred embodiment of the present invention;

FIG. 1B is a cross-sectional view of the stator chip along line B—B of FIG. 1A;

FIG. 1C is an enlarged view of a portion of the stator chip of FIG. 1B;

FIG. 1D is a further enlarged view of a portion of the stator chip of FIG. 1B;

FIG. 1E is a cross-sectional view of the stator chip along line E—E of FIG. 1A;

FIG. 1F is an enlarged view of a portion of the stator chip of FIG. 1E;

FIG. 2A is a plan view of a rotor according to a preferred embodiment of the present invention;

FIG. 2B is a cross-sectional view of the rotor along line B—B of FIG. 2A;

FIG. 2C is an enlarged view of a portion of the rotor of FIG. 2B;

FIG. 2D is a cross-sectional view of the rotor along line D—D of FIG. 2A;

FIG. 3A is a plan view of the rotor on the stator cluster in a valve closed position;

FIG. 3B is a cross-sectional view of the rotor and stator cluster along line B—B of FIG. 3A;

FIG. 4A is a plan view of the rotor on the stator cluster in a valve open position;

FIG. 4B is a cross-sectional view of the rotor and stator cluster along line B—B of FIG. 4A;

FIG. 7 is a perspective view of a rotary valve assembly according to a preferred embodiment of the present invention;

FIG. 8 is an exploded perspective view of the rotary valve assembly;

FIG. 13A is a cross-sectional view of a second embodiment of the rotary valve assembly in an assembled position;

FIG. 13B is a cross-sectional view of the second embodiment in a partially disassembled position;

FIGS. 15A and 15B show side views of a first embodiment of a translational variant of the valve of the present invention; and FIGS. 16A and 16B show side and front view of a second embodiment of the translational variant of the present invention.

DETAILED DESCRIPTION OF THE INVENTION

Figure 5A:
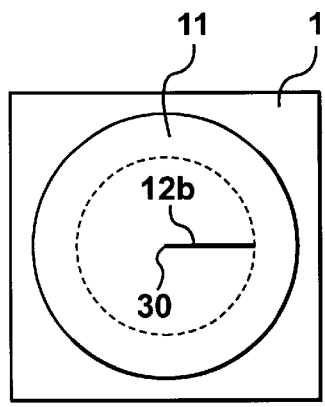
FIG. 5A is a plan view of a rotor according to a second embodiment of the present invention.
Figure 5B:
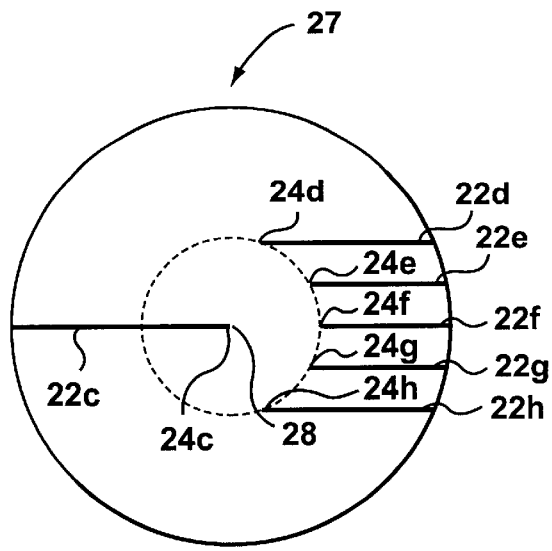
FIG. 5B is plan view of a stator cluster for a stator chip according to a second embodiment of the present invention.

As referred to herein, a microfluidic device is a fluidic device that is either:
a) is manufactured by micromachining (such as for example by using lithography, masks and photosensitive polymers to define features on a substrate and then using those features to etch or otherwise remove underlying layers or to build up additional layers) followed by bonding additional substrates to form closed channels;
b) has typical smallest dimensions between 250 $\mu$m and 1 $\mu$m; or
c) has manufactured from a mold or master which itself meets either of the criteria set out in (a) or (b) above.

The simplest microfluidic device is a channel chemically etched in glass. That is, chrome and gold films are put on the glass with a photosensitive polymer (photoresist) on top. A light source (UV or x-ray) and a photomask are used together to expose areas of the photosensitive polymer. The photoresist is developed, exposing the metal layer in some areas. The Au and Cr in the exposed areas are removed chemically, exposing the substrate beneath which can then be etched in a number of ways.

With glass, a wet isotropic etch (immersion in HF (hydrofluoric acid) is used. In this case, the profile of the channel will be roughly semicircular and will range in size from about 15 $\mu$m wide and 5 $\mu$m deep to 400 $\mu$m wide and 200 $\mu$m deep (the width is approximately 2× the depth+the original width of the exposed line).

Quartz can be etched as above or can be etched using Deep Reactive Ion Etching which produces square, rather than ¼ circular, sides (i.e. etches straight down).

Silicon can be etched using either of the methods above. In addition, there exist chemical anisotropic etches for silicon which preferentially etch in specific crystallographic directions producing channels of other distinct geometries.

For any of the above, repetition of and variations of the processes can lead to multiple etch depths and profiles on a single device.

"Chip" means one or more substrates which may be micromachined in accordance with conventional techniques. The preferred substrates for direct micromachining are glass, silicon, or quartz.

However quartz is an especially attractive material for the basic reason that analytical chemists have long worked using fused silica capillaries and have experience in exploiting and manipulating the surface qualities of this media. Quartz and other glasses have very similar properties to fused silica and their use removes some obstacles to porting technologies into the microchip format.

However, quartz is an extremely brittle material. The application of point forces easily results in the propagation of cracks throughout the material. Some of the problems encountered in working with this material and solutions found for these problems are outlined below.

The first problem was that the rotor would crack upon applying a force to press the rotor against the stator. This problem was overcome by placing one or two layers of tissue between the rotor and the shaft allowed a more even distribution of force from the shaft to the rotor and eliminated point forces caused by roughness of the stator cavity in the shaft Another problem was cracking of the rotor due to rotor geometry caused by forces acting on the corners of the square rotor during rotation. These forces caused point-loading on the rotor substrate, leading to cracking. This problem was solved by etching a circular dais on the surface of the rotor so that the contact surface of the rotor is a circular rather than rectangular.

A third problem was caused by minor but unavoidable perturbations of the axis of rotation of the shaft to the normal of the face of the stator resulted in the surfaces of the rotor and stator being non-parallel so that upon rotation of the rotor against the stator pressure between the surfaces was non-uniform. This lead to difficulty in creating a seal and often to cracking or grinding of the contact surfaces. This problem was solved by the addition of a thick (in the range of approximately 1–2 mm), compressible but firm material (e.g. cork or high durometer (60 or 70) rubber) between the rotor and the shaft allows the rotor/substrate surfaces to remain parallel despite small variations in the axis of rotation of the shaft. This also provides the function of the tissue required to solve the first problem described above.

FIGS. 1A–1F show a stator chip 2 for a microfluidic rotary valve according to a preferred embodiment of the present invention. An inlet for a test sample or the like and an outlet (described in detail below) are provided in the stator chip 2. The stator chip is composed of a first planar substrate 20 acting as a bottom plate and a second planar substrate 21 acting as a cover plate.

A first inlet channel 22a and a first outlet channel 22b are etched into the first substrate 20 using conventional micromachining techniques. A second inlet channel 24a and second outlet channel 24b are drilled through the second substrate 21 using ultrasonic or laser drilling techniques. In addition, interconnect holes 23a and 23b may be drilled into the second substrate 21 in order to connect the first inlet channel 22a and first outlet channel 22b to other fluidic systems (not shown) with which the valve may be used. Alignment holes 25a, 25b, 25c, and 25d may be drilled into the second substrate in order to fix the stator chip 2 within the valve housing (described in detail below).

Grinding and polishing of the first and second substrate 20, 21 surfaces may be required after drilling to ensure that the surfaces are flat.

Referring again to FIGS. 1A–F, the first substrate 20 and second substrate 21 are then bonded together by first cleaning the surfaces to allow a contact bond and by subsequently annealing the bonded substrates at an elevated temperature (for example at 1100° C. for quartz). The bonding is such that the first inlet channel 22a and first outlet channel 22b etched into first substrate 20 are covered by the second substrate 21 to form closed channels. The first inlet channel 22a and first outlet channel 22b communicate with the second inlet channel 24a and second outlet channel 24b, respectively. Preferably the first inlet channel 22a and second inlet channel 24a form the inlet described above, while the first outlet channel 22b and the second outlet channel 24b form the outlet described above.

A stator low friction material layer 26, such as a diamond-like carbon (DLC) coating (best shown in FIG. 1D) is deposited on the second substrate 21 contact surface 29 which engages a rotor 1, described below. The DLC coating has very low friction and is very hard, thus preventing wear between the stator chip 2 and rotor 1.

The stator chip 2 is enclosed into the housing by fastening the housing top to the housing center with the chip in the recess of the housing center. The configuration is such that this operation fixes the position of the stator chip 2 without subjecting the stator chip 2 to any forces that would act to twist or to otherwise deform the stator chip 2. Deformation of the stator chip 2 would cause difficulties in creating a good seal between the rotor 1 and the stator chip 2, between the fluidic interconnects and the interconnect vias and also lead easily to the destruction of the stator chip. Thus, when the cap 57 is fastened there is a gap between the stator chip and the housing top.

All of the point forces applied to the stator chip 2 (i.e. the rotor 1 and the fluidic interconnects) come from the bottom of the chip and tend to press the chip into the (flat) housing cap 57. Thus, each point force is balanced by the housing cap. If the housing cap were not flat and parallel to the plane of contact between the rotor and the stator, or if the point loading were from different sides of the stator chip, the point forces would be unbalanced by the housing cap and would create torsion in the chip, leading to difficulties in sealing the rotor and interconnect interfaces and in the potential damage and/or destruction of the chip.

Micromachining process and especially the thermal bonding of the stator chip substrates entails by necessity thermal cycling of the material, leading to internal stresses in the material and subsequent material deformation to reduce those stresses. Thin films such as are used in micromaching techniques and such as the final DLC coating of the rotor and stator chip also contribute to intrinsic stress and deformation. As surface flatness at the rotor/stator interface and indeed across the entire chip require minimal deformation of the stator chip, processes which minimize the accumulation of stress in the material are preferred. Thus, the present invention preferably employs processes that are carried out using low temperature techniques when possible (for example, low energy film application), and longer than usual heating and cooling stages when high temperatures are unavoidable (for example, thermal bonding)

FIGS. 2A–D show the rotor 1, which is preferably a rotor chip composed of a rotor substrate 10. A circular raised dais 11 is formed in the rotor substrate 10 by etching away the material surrounding the dais 11. A radial rotor channel 12a is etched into the dais 11 at the same time as the material 15 surrounding the dais 11 so that depth of the channel 12a is similar to the height of the step between the surrounding material 15 and the dais 11. A rotor low friction material layer, such as a DLC coating 13 (best shown in FIG. 2D), is deposited on the rotor contact surface 16 for engaging the stator chip 2. Preferably, the DLC coating has a thickness between 1 and 10 microns and covers the entire surface of the rotor including the inside of rotor channel 12a.

FIGS. 3–4 show the rotor 1 superimposed over the stator chip 2 in a 1:1 valve implementation according to a preferred embodiment of the present invention. During valve operation the rotor 1 and a stator cluster portion 27 of the stator chip 2 are in sealed engagement. The stator cluster portion 27 is the area of the contact surface 29 of the stator chip 2 that comes into contact with a facing surface of the rotor. The stator cluster portion 27 has a stator center 28 (shown in FIG. 1A) against which the rotor center must be held. The stator center 28 is a geometric point defined by the valve design as the center of rotation of the rotor 1 on the stator chip 2.

FIGS. 3A and 3B show the rotor channel 12a of the rotor 1 positioned relative to the stator chip 2, such that fluid communication between the second inlet channel 24a and the second outlet channel 24b is prevented and the valve is closed.

FIGS. 4A and 4B show a valve open position, where the rotor channel 12a is aligned with the second inlet channel 24a and the second outlet channel 24b to provide a fluid pathway therebetween, permitting fluid to flow through the valve.

Figure 5C:
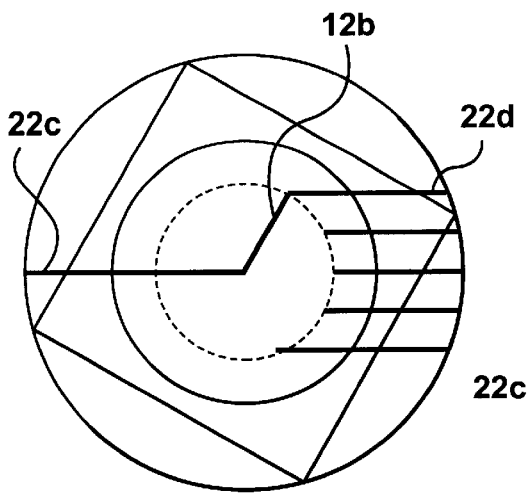
FIG. 5C is a plan view of the rotor on the stator cluster of the second embodiment in a valve open position.
Figure 5D:
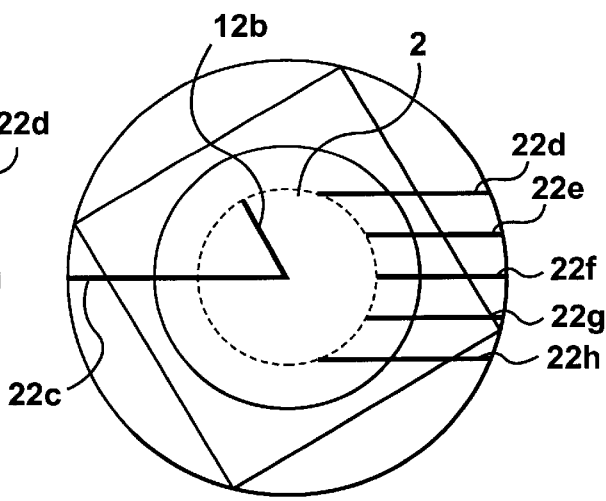
FIG. 5D is a plan view of the rotor on the stator cluster of the second embodiment in a valve closed position.

FIGS. 5A–D show an alternative embodiment of a rotor and stator chip according of the present invention in a 1:5 selector valve implementation. For simplicity and security, like components are given the same reference numeral, with an appropriate suffix to distinguish them. As shown in FIG. 5A, a radial rotor channel 12b extends from the center 30 of the rotor dais 11. Referring now to FIGS. 5C–D, a first inlet channel 22c extends from the edge of the stator chip 2 to the center 28 of the stator cluster 27 and communicates with the rotor channel 12b via a second inlet channel 24c (not shown) extending through the second substrate 21 at the center 28 of the stator cluster 27. Five additional first outlet channels 22d–22h are arranged around an arc inscribed by the outer end of the radial rotor channel 12b. First outlet channels 22d–h (in the first substrate 20) communicate with five corresponding second outlet channels 24d–h (in the second substrate 21), which in turn communicate with the stator contact surface 29.

FIG. 5C shows a superposition of the rotor 1 over the stator cluster 27 with their respective centers 30 and 28 vertically aligned and with the rotor channel 12b of rotor 1 rotated with respect to stator cluster 27 to create a pathway from first inlet channel 22c through the second inlet channel 24c and second outlet channel 24d to first outlet channel 22d. A fluid pathway can be created in a similar fashion with any of the first outlet channels 22e–h by rotating the rotor 1. As shown in FIG. 5D, the rotor 1 may be moved into a valve closed position by rotating the rotor channel 12b to a position out of fluid communication with the second outlet channels 24d–h. It will be understood by those skilled in the art that any number of outlet channels may be formed in the stator cluster 27 and that any number of channel configurations may be formed in the rotor 1.

Figure 6A:
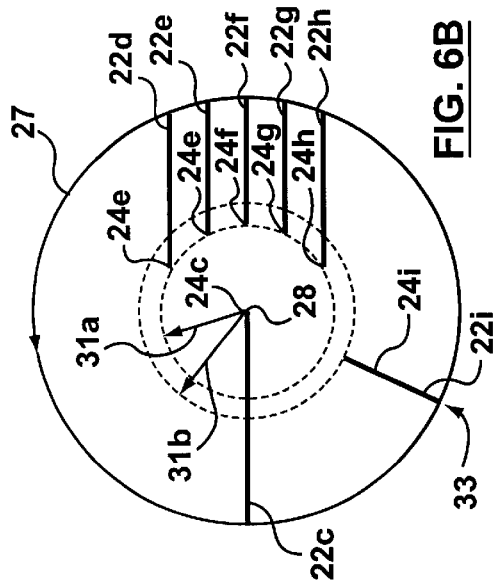
FIG. 6A is a plan view of a rotor according to a third embodiment of the present invention.
Figure 6B:
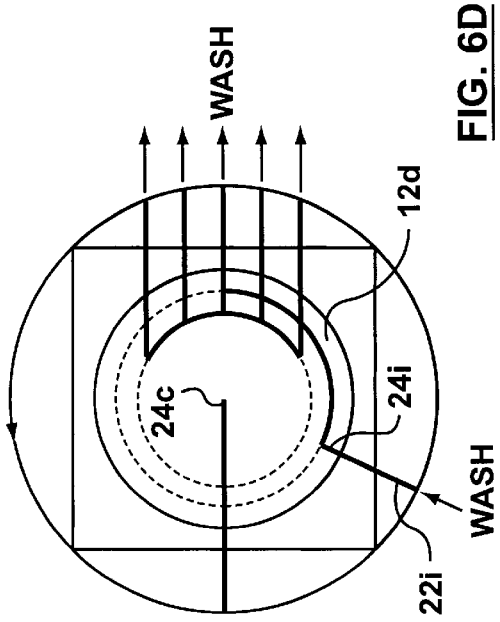
FIG. 6B is plan view of a stator cluster for a stator chip according to a third embodiment of the present invention.

FIGS. 6A–E show a second alternative embodiment of the rotor and stator combination according to the present invention. This embodiment is identical to that shown in FIGS. 5A–D, except for the addition of a wash assembly described in detail below. The rotor 1 includes an additional wash channel 32 which is composed of a pair radially spaced apart arcuate portions 32a and 32c connected by a radial portion 32b. FIG. 6B shows the stator cluster 27 for this embodiment wherein a wash inlet 33 is composed of an additional first inlet channel 22i (in the first substrate 20) and an additional second inlet channel 24i (in the second substrate 21) located distances 31a, 31b respectively from the center 28 of the stator cluster 27.

Figure 6C:
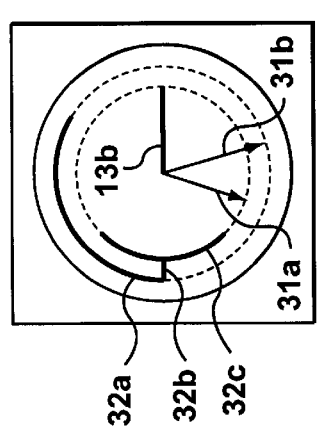
FIG. 6C is a plan view of the rotor on the stator cluster of the third embodiment in a valve open position.

FIG. 6C shows the equivalent function to that of FIG. 5C, such that there is no fluid communication between the wash inlet 33 and wash channel 32.

Figure 6D:
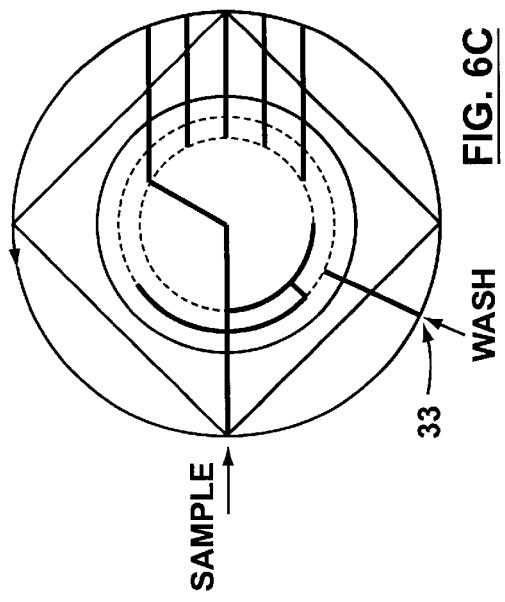
FIG. 6D is a plan view of the rotor on the stator cluster of the third embodiment in a wash position.

FIG. 6D shows wash channel 32 establishing a fluid pathway between the wash inlet 33 and all of the first outlet channels 22d–22h, thereby permitting a wash fluid to be sent through all of the outlet channels. Channel 12b is in a position where it does not establish a fluid pathway permitting sample flow, thereby preventing the sample flow. This embodiment is most useful for multiple uses of the stator chip.

Figure 11:
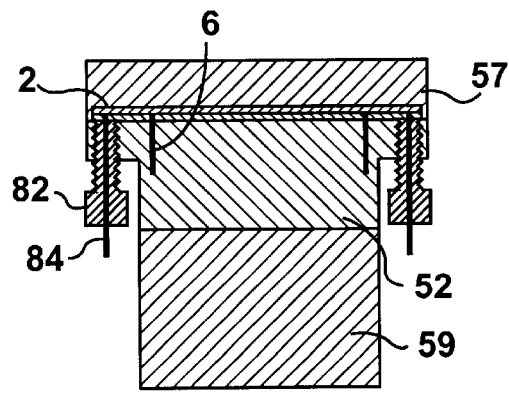
FIG. 11 is a cross-sectional view of the rotary valve assembly along line B—B of FIG. 9.

Any suitable means may be provided for engaging and sealing the rotor 1 to the stator chip 2. FIG. 7 shows a microfluidic rotary valve assembly for engaging the rotor 1 and stator chip 2, according to a preferred embodiment of the present invention. Referring to FIGS. 7 and 11, the stator chip 2 is located within a stator cavity 53 of a housing body 52. Preferably four pins 6 are received within corresponding alignment holes 54 drilled in the housing body 52. The exposed ends of pins 6 locate within alignment holes 25*a*–*d* (shown in FIG. 1A) of the stator chip 2 to ensure that the center of the stator cluster 27 is fixed in relation to the center of the rotor 1. Preferably, the depth of the stator cavity 53 is slightly greater than the thickness of the stator chip 2, so that a housing cap 57 may be tightly fastened by any suitable fasteners, such as screws 70, without exerting any deforming force on the stator chip 2. Preferably, the housing cap 57 is made from a transparent material, such as plexiglass to permit optical observation of the stator chip 2.

Figure 9:
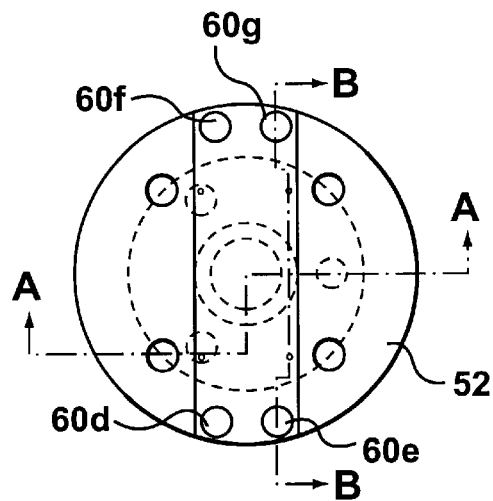
FIG. 9 is a top plan view of the rotary valve assembly.

As shown in FIGS. 7, 9 and 11, the housing body 52 also includes at least two threaded holes 60 (four threaded holes 60*e*–*g* are shown) which communicate with interconnect holes in the stator chip 2, such as holes 23*a*–*b* (shown in FIG. 1A). Capillaries or tubing 84 can be connected to the threaded holes using conventional flat-bottomed chromatographic fittings 82. The stator chip 2 may then be connected to various other fluidic components or systems via the tubing 84. This then ensures that all loads on the stator chip are from one side, pressing the slate or chip against the housing cap 57. The housing cap 57 can then be provided with a smooth surface, to prevent any stern concentration on the stator chip 2.

Figure 10:
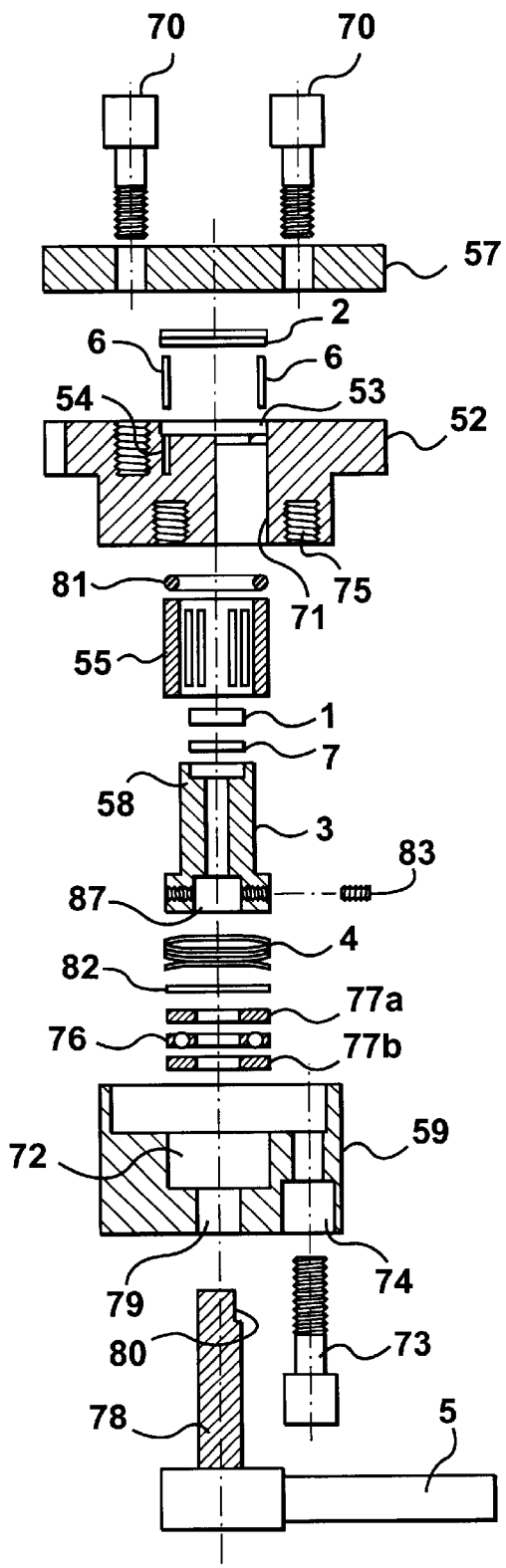
FIG. 10 is an exploded cross-sectional view of the rotary valve assembly along line A—A of FIG. 9.
Figure 12:
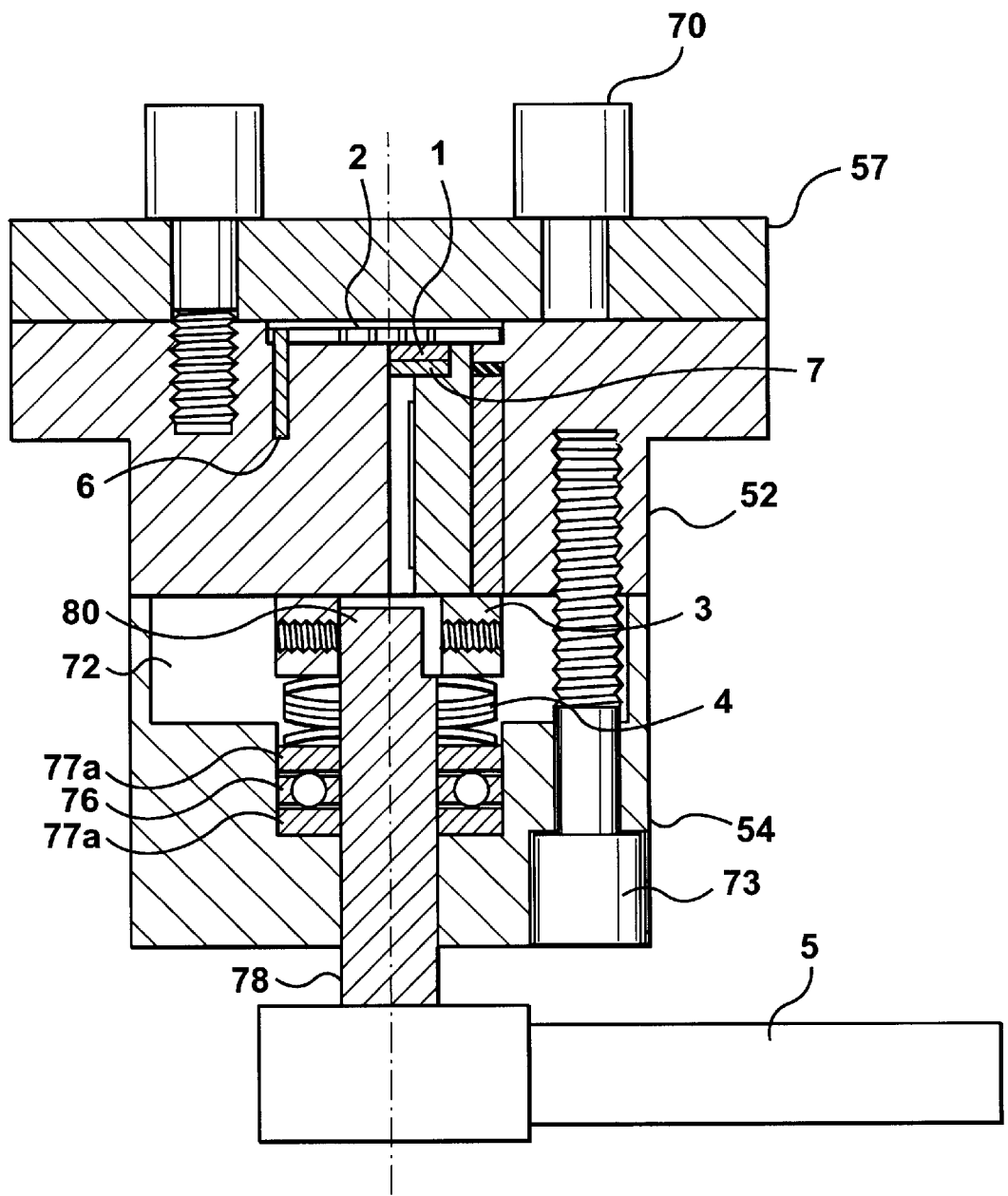
FIG. 12 is a cross-sectional view of the rotary valve assembly along line A—A of FIG. 9.

Referring to FIGS. 8, 10, and 12, a rotor cushion 7 and rotor 1 are inserted into a rotor cavity 58 in the shaft 3. The rotor cushion 7 may be constructed from any suitable resilient material. Preferably, the cushion 7 is approximately 1 to 2 mm in thickness and is made from a compressible but firm material, such as cork or high durometer (60–70) rubber. The rotor 1 is fixed in relation to the shaft 3. The depth of the rotor cavity 58 is slightly smaller than the combined thickness of the compressed rotor cushion 7 and the rotor 1, such that the rotor 1 protrudes out of the rotor cavity 58 of the shaft 3. A needle bearing 55 is received in a corresponding bore 71 in the housing body 52. A portion of the shaft 3 is received within the needle bearing 55, with the remaining portion of the shaft 3 protruding from the bore 71. To further aid the alignment of the shaft 3 a high durometer o-ring 81 is inserted over the shaft 3 above the needle bearing 55. The o-ring 81 is compressed by the bearing 55 against the bore 71 and the shaft 3 so as to hold the shaft 3 in the center of the bore 71.

Referring again to FIGS. 8, 10 and 12, a housing base 59 is secured to the housing body 52 by conventional fasteners, such as screws 73, received in corresponding holes 74, 75 in the housing base 59 and housing body 52, respectively. A three-piece thrust bearing, comprising a bearing ring 76 and two washers 77*a* and 77*b*, is located in a base cavity 72 within the housing base 59. A biasing means, such as a stack of disc springs 4 sit on the washer 77*b* and engage the protruding portion of shaft 3 which is received in the base cavity 72. The disc springs 4 urge the shaft 3 into the housing body 52 in order to press the stator chip 2 against the rotor 1. The stator chip 2 is pushed away from the bottom of the stator cavity 53 and against the housing cap 57. The disc springs 4 exert sufficient force on the shaft 3 to bring the rotor 1 into sealing engagement with the stator 2. The force with which the rotor 1 is pressed against the stator 2 is determined by the type, number, stacking arrangement and compression of the disc springs. Accordingly, additional washer(s) 82 may be used to increase the compression of a given number of disc springs, as is known in the art.

The shaft 3 and rotor 1 are rotated by an actuating means, such as a handle 5, or alternatively by a motor (not shown) connected to the shaft 3. A handle shaft 78 is received in a bore 79 in the housing base 59 which communicates with the base cavity 72. A distal end 80 of the handle shaft 78 engages a handle cavity 87 of the shaft 3 in order to rotate the shaft 3. The distal end 80 is provided with a flat surface and in known manner, at screw 83 engages that flat surface, to secure the handle shaft 78 to the shaft 3.

The shaft 3 rotates the dais 11 of the rotor 1 against the stator cluster 27 of the stator chip 2 to open and close the valve as described in detail above. A seal is provided between the dais 11 of the rotor the stator cluster 27 by forcing the rotor 1 against the stator chip 2. The sealing force is provided the disc springs 4 which act on the shaft 3. The force on the shaft 3 forces the stator chip 2 slightly away from the bottom of the stator cavity 53 and against an inner surface the housing cap 57. Preferably, the inner surface of the housing cap 57 is smooth and parallel to the plane of the stator chip 2 in order to minimize any point forces on the stator which may cause cracking or prevent formation of a seal.

The rotor cushion 7 distributes any point forces acting on the rotor 1 which may be caused by roughness of the shaft cavity 58. By providing a more even force distribution, the rotor cushion reduces the likelihood of cracking or breaking of the rotor 1. In addition, the rotor cushion also reduces forces caused by small misalignments in the axis of rotation to the shaft 3 relative to a plane normal to the rotor 1 and the stator chip 2. The preferably circular shape of the rotor dais 11 also assists with the reduction of point forces on the rotor 1.

The rotary valve according to the present invention is capable of operating at pressures of as high as 1000 PSI, although it can also operate at lower pressures.

In addition, the rotary valve according to the present invention permits easy removal and replacement of the stator chip 2 by unscrewing the screws 70 and removing the housing cap 57 to access the stator chip 2. The easy replacement of the stator chip 2 is advantageous for analytical chemistry applications, where a single use chip may be desirable to avoid contamination problems.

In addition, the microfluidic rotary valve and stator chip according to the present invention, provides an advantage over macromachined rotary valves which are connected to other microfluidic devices via tubing. The stator chip according to the present invention may be constructed with various microfluidic devices (such as a sample injector, reaction chamber, mixer, etc.) integrated into the stator chip and connected to the stator cluster by channels. Preferably, such a chip would be contained within the valve housing, as described above. A portion of the chip may then be used as the stator cluster 27 (as described above) to control fluid flow to the remaining portions of the chip which carry out other microfluidic processes. Channels within the chip constructed as described above would provide fluid communication between the stator cluster 27 and the various microfluidic devices constructed on the stator chip 2. Such an integrated chip combines the advantages of microfluidics (such as faster reactions, reduced material costs, minimal dead and swept volumes) with the advantages of a rotary valve (such as high functionality, high pressure operation). Consequently, such an integrated stator chip avoids the disadvantages of plumbing from a microfluidic chip to a conventional rotary valve. These disadvantages include increased dead and swept volumes, and decreased performance.

The further advantage of combining the number of devices, and possibly one or more valves in one chip, is that all the critical operations are then contained on a single chip. It is then not necessary to be concerned with details of connections to the chip. In other words, connections can be made to the chip with relatively large dead volumes, since critical operations requiring maintenance of small dead volumes are all contained on the chip.

While the above description constitutes the preferred embodiments, it will be appreciated that the present invention is susceptible to modification and change without departing from the fair meaning of the proper scope of the accompanying claims.

For example, FIGS. 13A and 13B show an alternative embodiment of the rotary valve where force on the disc springs 4 is generated by tightening an externally threaded nut 80 which is received in a threaded bore 81 of the housing base 59. The remaining parts of the valve are identical to the preferred embodiment described above, and their description is not repeated.

Referring to FIG. 13B, in operation, the nut 80 may partially unscrewed from the housing body 59 so that the rotor 1 no longer exerts pressure on the stator chip 2. The stator chip 2 can then be replaced as described above. The rotor 1 can also be replaced by removing the nut 80 from the housing body, permitting the removal of the handle 5 and shaft 3 from the housing base 59 and body 52. The rotor 1 can then be removed from shaft cavity 58 and replaced by another rotor. Replacement of the rotor permits the use of different valving configurations for the valve. Otherwise the operation of the valve is identical to that described above.

Figure 14B:
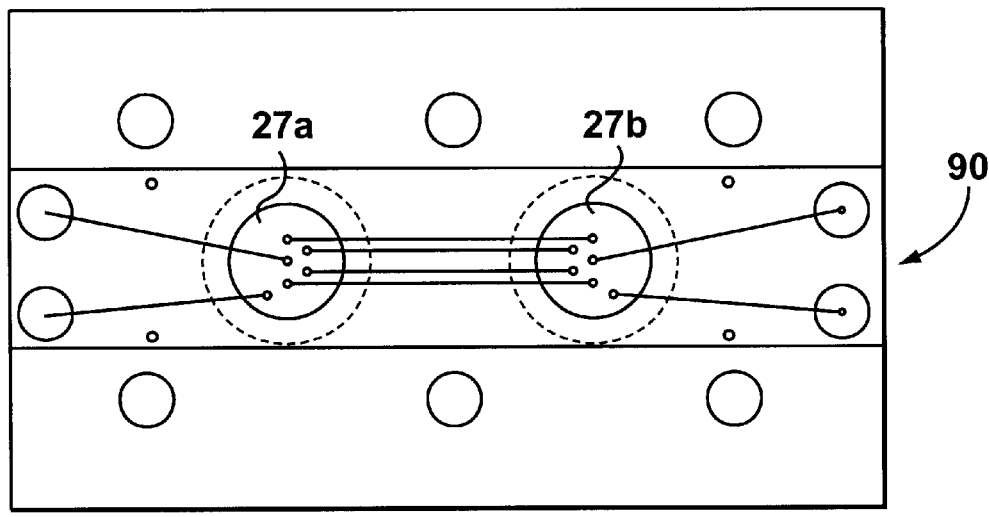
FIG. 14B is a plan view of a multi-valve stator chip according to an alternative embodiment of the present invention.
Figure 14A:
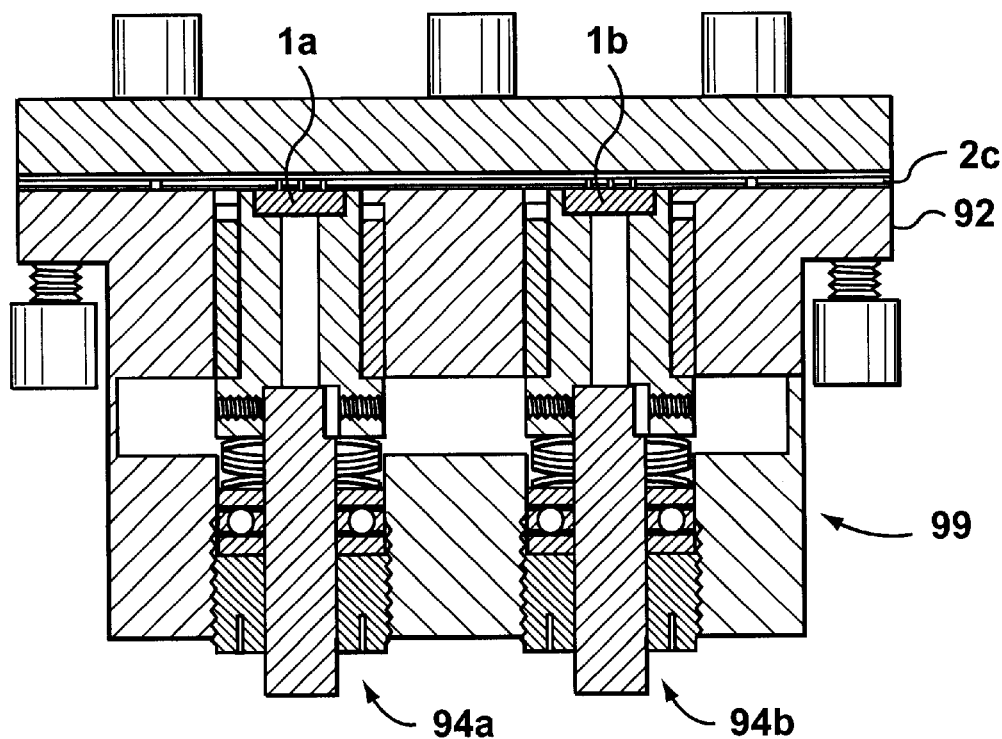
FIG. 14A is a cross-sectional view of a multi-valve rotary valve assembly according to an alternative embodiment of the present invention.

FIGS. 14A and 14B show yet another alternative embodiment of the rotary valve according to the present invention. A multi-valve stator chip 90 includes two stator clusters 27a and 27b and is received in a modified housing body 92 and housing base 99. The housing body and base are modified to receive two identical shaft assemblies 94a and 94b which control two rotors (not shown). Each rotor can operate independently to provide more flexibility in the valving configurations. Otherwise, the valve operates as described in detail above.

The foregoing embodiments have all been for rotary versions of a valve in accordance with the present invention. The invention also encompasses valves in which the rotor is replaced by a valve member that does not rotate, but instead is subject to translational movement or sliding movement along a line. It is also possible that the valves could be configured to have valve members that are subject to a combination of both translational and rotary motion.

Referring first to FIGS. 15A and 15B, these show a first embodiment of a translational variant of the valve of the present invention. Here, the stator is indicated at 102 and includes a first substrate 104 and second substrate 106, as in the earlier embodiments. This first embodiment includes two inlets indicated at 112, 114. Details are provided only for inlet 112, and it includes an interconnect hole 112A, a first inlet channel 112B and a second inlet channel 112C. Corresponding to earlier embodiments, the first inlet channel 112B is formed by etching in the first substrate 104, while the second inlet channel 112C is formed, for example, by drilling, as a hole passing through the second substrate 106.

Additionally, there is provided an outlet indicated at 116. The outlet would have a similar form to each of the inlets 112, 114, but is out of the plane of FIG. 15A.

Above the stator 102, there is a valve member 108, replacing the rotor of the earlier embodiments. The valve member 108 includes a raised dais 110, corresponding to that of the earlier embodiments. Although not shown, the raised dais 110 includes a channel permitting fluid communication between an inlet and outlet pair as detailed below.

The valve member 108 is mounted in a valve holder 118. To maintain a sealing force between the valve member 108 and the stator 102, a pressure mechanism is provided above the holder 118. The pressure mechanism includes a fixed bracket 120, and a piston and cylinder assembly indicated at 122, 124. The piston 122 is pivotally attached at one end to the bracket 120 and slidably mounted within the piston 122. The piston 124, in turn, is pivotally attached to the top, center of the holder 118. A spring 126 acts between the piston 122 and the cylinder 124 to maintain a downward force, F1, on the holder 118.

To locate the holder 118, and hence the valve member 108, there are first provided guides on either side of the holder 118, behind and in front of the plane of FIG. 15A (not shown). This constrains the holder 118 to move laterally in the plane of FIG. 15A.

To control the motion of the holder 118, a screw nut mechanism is provided on one side comprising a fixed threaded member 130 and a screw 132. An end of the screw 132 abuts the holder 118. On the other side of the holder 118, there is a second piston and cylinder arrangement, comprising a piston 136 slidably mounted in a cylinder 138. The cylinder 138 is fixed relative to the stator 102 and the fixed bracket 120. A sprint 138 acts between the cylinder 134 and the piston 136, to press the piston 136 against the holder 118.

Consequently, the holder 118 is maintained pressed between the free end of the piston 136 and the screw 132. Adjustment of the screw 132 will then alter the horizontal location of the holder 118.

FIG. 15A shows a neutral position of the valve member 108, in which no fluid connection is made. If the screw member 132 is screwed in, then the valve member 108 with the holder 118 are displaced to the right, to the position in FIG. 15B. Then, fluid connection is provided between the inlet 114 and the outlet 116.

Reference will now be made to FIGS. 16A and 16B which show a second embodiment of this translational variation of the invention. This second embodiment is generally indicated by the reference 140.

A housing comprises a housing base 142 and a housing cap 144. These define an elongate channel, and at the bottom of the channel, there is located the stator, again comprising first and second substrates 146, 148. Here, an inlet 150 and an outlet 152 are provided. As shown, they have similar configurations as in preceding embodiments, and their details are not described again.

A moving valve member is shown at 154, and again includes a raised dais 156 with a fluid channel (not shown). The moving valve member 154 is mounted in a holder comprising a holder base 158 and holder cap 160. A plurality of disc springs 162 are provided between the valve member 154 and the holder cap 160. As above, various means could be provided to spread the load provided by the springs 162, and to accommodate minor misalignments, tolerances and the like.

As shown in FIG. 16B (but not FIG. 16A), bearings 180 are provided between the valve holder 158, 160 and the valve housing 142, 144. This constrains the valve member 154 to travel in the plane of FIG. 16A.

As for the embodiment of FIG. 15, a screw mechanism comprising a fixed threaded member 170 and a screw 172 is provided on one side, abutting the valve holder 160. On the other side, a piston and cylinder arrangement with a piston 176 slidably mounted to a cylinder 174 is provided. A spring 178 provides a biasing force F2, maintaining the valve holder 160 against the screw 172.

In use, the screw 172 can be used to move a channel in the valve member 154, so that it either permits communication between the inlet and outlet 150, 152, or closes off the inlet 150 from the outlet 152.

A translational version of the invention in FIGS. 15, 16 can also incorporate the variants mentioned for the rotational aspects of the invention. Thus, the substrate can again include microfluidic devices. More than one valve can be incorporated on a single stator. Additionally, it is possible for a single stator to include microfluidic devices, and mixed valve types, e.g. one rotational valve and one translational valve.

What is claimed is:

1. A microfluidic valve comprising:
    a) a stator chip defining at least one inlet and at least one outlet therein, wherein the stator chip comprises a first planar substrate and a second planar substrate having facing contract surfaces sealably secured together, wherein the first planar substrate defines a first portion for each of the at least one inlet and for each of the at least one outlet, and the second planar substrate defines a second portion for each of the at least one inlet and each of the at least one outlet; and
    b) a rotor sealably engaging the stator chip, the rotor defining at least one rotor channel therein, said rotor being rotatable between a closed position preventing fluid communication between at least one inlet and at least one outlet, and an open position where at least one rotor channel is in fluid communication with at least one inlet and at least one outlet.

2. The valve of claim 1, wherein the rotor has a facing surface and the stator chip defines a stator cluster portion for sealably engaging the facing surface of the rotor, wherein the at least one inlet and the at least one outlet open onto the stator cluster portion, and, the stator chip includes at least one microfluidic device in fluid communication with the stator cluster portion.

3. The valve of claim 2, wherein the rotor has a facing surface and the stator chip defines a stator cluster portion for sealably engaging the facing surface of the rotor, wherein the at least one inlet and the at least one outlet, open onto the stator cluster portion.

4. The valve of claim 3, further comprising a housing, the rotor and stator being located in the housing, the housing comprising a securing means for removably securing the stator within the housing.

5. The valve of claim 4, wherein the housing comprises a housing body, a housing cap removably connected to a first end of the housing body, and a housing base connected to a second end of the housing body.

6. The valve of claim 5, wherein the housing body defines a stator cavity therein, the stator cavity being adapted to removably secure the stator chip therein.

7. The valve of claim 6, wherein the depth of the stator cavity is greater than the thickness of the stator chip.

8. The valve of claim 6, further comprising a shaft rotatably received in a bore defined in the housing body, the shaft being adapted to removably secure the rotor therein.

9. The valve of claim 8, wherein the shaft defines a rotor cavity in a first end thereof, and the rotor is removably secured within the rotor cavity.

10. The valve of claim 9, further comprising a biasing means applying a force to the rotor, to press the rotor against the stator chip, thereby maintaining the rotor and the stator chip in sealing engagement.

11. The valve of claim 10, further comprising a distribution means for distributing the force against the rotor.

12. The valve of claim 11, wherein the distribution means comprises a layer of cushioning material located in the rotor cavity under the rotor.

13. The valve of claim 10, wherein the biasing means comprises at least one spring located in a base cavity defined in the housing base, the at least one spring being adapted to urge the shaft toward the stator chip.

14. The valve of claim 13, wherein each spring comprises a disc spring.

15. The valve of claim 14, further comprising a first bearing between the shaft and the housing body and a thrust bearing between the biasing means and the housing base.

16. The valve of claim 10, further comprising an actuating means for rotating the rotor between the open and closed positions, the actuating means being operatively connected to the shaft.

17. The valve of claim 16, wherein the actuating means comprises a handle shaft and a handle connected thereto, the handle shaft being rotatably received within the housing base, the handle shaft being removably secured to the shaft by a set screw.

18. The valve of claim 3, wherein the rotor includes a dais, wherein the at least one rotor channel is defined in the dais and the facing surface is provided on the dais, the stator cluster being adapted for sealably engaging the facing surface on the dais.

19. The valve of claim 9, wherein the rotor includes a non-circular portion and extending therefrom a circular dais, wherein the at least one rotor channel is defined in the dais and the facing surface is provided on the dais, wherein the rotor cavity of the shaft is non-circular and complementary to the non-circular portion of the rotor for transmittal of rotary motion, and wherein the at least one rotor channel is defined in the dais, and the facing surface is provided on the dais for sealably engaging the stator cluster portion.

20. The valve of claim 1, wherein each of the at least one inlet comprises:
    a) a first inlet channel extending longitudinally between the first planar substrate and the second planar substrate; and
    b) a second inlet channel extending transversely through the second planar substrate, the second inlet channel being in fluid communication with the first inlet channel.

21. The valve of claim 20, wherein each of the at least one outlet comprises:
    a) a first outlet channel extending longitudinally between the first planar substrate and the second planar substrate; and
    b) a second outlet channel extending transversely through the second planar substrate, the second outlet channel being in fluid communication with the first outlet channel.

22. The valve of claim 21, wherein at least a portion of each first inlet channel and at least a portion of each first outlet channel comprise elongate depressions defined within the first substrate contact face.

23. The valve of claim 22, wherein the first inlet and the first outlet channels are etched on the first substrate contact face.

24. The valve of claim 23, wherein the second inlet and the second outlet channels are drilled through the second substrate.

25. The valve of claim 22, wherein the rotor has a facing surface and the stator chip defines a stator cluster portion for sealably engaging the facing surface of the rotor, wherein the stator chip further comprises a stator low friction material layer provided at the stator cluster portion, and wherein the at least one inlet and the at least one outlet open onto the stator cluster portion.

26. The valve of claim 25, further comprising a rotor low friction material layer provided on the facing surface of the rotor.

27. The valve of claim 22, wherein the rotor is a rotor chip.

28. The valve of claim 27, wherein each of the stator chip and the rotor chip are formed from quartz.

29. The valve of claim 28, wherein at least one of the height and the width of the channels is in the range of 1–250 microns.

30. The valve of claim 22, which includes a microfluidic device.

31. The valve of claim 30, which includes at least two rotary valves.

32. The valve of claim 31, which includes a plurality of outlets, and wherein the at least one inlet comprises an inlet opening on the axis of rotor and wherein the at least one rotor channel comprises a channel extending between the axis of the rotor and a location radically spaced from the rotor axis for fluid communication with a selected one of the outlets.

33. The valve of claim 32, wherein the stator includes a second inlet providing a wash inlet and the rotor includes a wash channel configured for providing fluid communication between the wash inlet and all the outlets simultaneously.

34. A microfluidic valve comprising:
   a) a stator chip defining an inlet and an outlet therein, wherein the stator chip comprises a first planar substrate and a second planar substrate having facing contact surfaces sealably secured together, wherein the first planar substrate defines a first portion of the inlet and outlet, and the second planar substrate defines a second portion of the inlet and outlet; and
   b) a second chip sealably engaging the stator chip, the second chip defining a valve channel therein, the second chip being movable between a closed position preventing fluid communication between the inlet and the outlet, and an open position where the valve channel is in fluid communication with the inlet and the outlet.

35. The valve of claim 34, wherein the second chip defines a facing surface and the stator chip defines a stator cluster portion for sealably engaging the facing surface of the second chip, wherein the inlet and outlet open onto the stator cluster portion, and the stator chip includes at least one microfluidic device in fluid communication with the stator cluster portion.

* * * * *